United States Patent
Lin et al.

(10) Patent No.: US 8,758,248 B2
(45) Date of Patent: Jun. 24, 2014

(54) SYSTEMS AND METHODS FOR ACOUSTIC RADIATION FORCE IMAGING WITH ENHANCED PERFORMANCE

(75) Inventors: Feng Lin, Niskayuna, NY (US); Michael Joseph Washburn, Brookfield, WI (US); Christopher Robert Hazard, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 165 days.

(21) Appl. No.: 12/957,289

(22) Filed: Nov. 30, 2010

(65) Prior Publication Data
US 2012/0134233 A1     May 31, 2012

(51) Int. Cl.
*A61B 8/00*     (2006.01)

(52) U.S. Cl.
USPC .................................... 600/438; 73/645

(58) Field of Classification Search
USPC .................................... 600/438; 73/645
See application file for complete search history.

(56) References Cited

U.S. PATENT DOCUMENTS

| | | | |
|---|---|---|---|
| 6,508,770 B1 * | 1/2003 | Cai ................................ 600/447 |
| 6,517,489 B1 * | 2/2003 | Phillips et al. ................ 600/458 |
| 6,716,168 B2 | 4/2004 | Nock et al. |
| 7,374,538 B2 | 5/2008 | Nightingale et al. |
| 2004/0102703 A1 | 5/2004 | Behren et al. |
| 2005/0215899 A1 | 9/2005 | Trahey et al. |
| 2008/0097207 A1 | 4/2008 | Cai |
| 2010/0298709 A1 * | 11/2010 | Needles et al. ................ 600/458 |

OTHER PUBLICATIONS

Dahl et al., "A Parallel Tracking Method for Acoustic Radiation Force Impulse Imaging", NIH Public Access, IEEE Trans Ultrason Ferroelectr Freq Control. Author manuscript, Feb. 2007, vol. 54(2), pp. 301-312.

\* cited by examiner

*Primary Examiner* — Jonathan Cwern
(74) *Attorney, Agent, or Firm* — Scott J. Asmus

(57) ABSTRACT

Methods and systems for ultrasound imaging are presented. The method includes configuring a plurality of apertures in a transducer array of an ultrasound imaging device, where the apertures include one or more transducer elements. Further, one or more reference pulses are delivered to a plurality of target regions to detect corresponding initial positions. Additionally, a pushing pulse is delivered to at least two of the plurality of target regions through at least two of the plurality of apertures. The plurality of apertures is focused at specific target regions in the plurality of target regions using a compound delay profile. Subsequently, one or more tracking pulses are delivered to the plurality of target regions for detecting corresponding displacements of at least the specific target regions. Further, ultrasound imaging methods that deliver a plurality of short pushing pulse segments and/or tracking pulses to corresponding target regions in an interleaving manner are described.

10 Claims, 6 Drawing Sheets

SYSTEMS AND METHODS FOR ACOUSTIC RADIATION FORCE IMAGING WITH ENHANCED PERFORMANCE

BACKGROUND

Embodiments of the disclosure relate to ultrasound imaging, and more particularly to acoustic radiation force imaging with enhanced performance.

Ultrasonography is an ultrasound-based diagnostic medical imaging technique used to visualize muscles, tendons, and many internal organs to capture their size, structure and any pathological lesions using near real-time tomographic images. Ultrasonography also finds use in therapeutic procedures where ultrasound is used to guide interventional procedures, such as biopsies or drainage of fluid collections. Conventionally, an ultrasonographic system operates by applying acoustic energy with a frequency, for example, in the range of 1-18 Mhz, although higher frequencies have been used in certain applications.

A typical ultrasonographic system employs a probe including one or more acoustic transducers such as piezoelectric transducers for delivering brief ultrasound pulses to a target region. Accordingly, the probe may be coupled to an ultrasonic scanner that provides electrical signals for transmission of the ultrasound pulses towards the target region. The transmitted ultrasound pulses partially reflect back from the target region and cause vibrations in the transducer on receipt. The transducer converts the vibrations into signals that travel to the ultrasonic scanner where they are processed and transformed into a digital image of the target region, such as biological tissues.

Accordingly, one application of ultrasonography includes measuring tissue stiffness. Measurement of the shear or Young's modulus of tissue, or more simplistically, measuring the "stiffness" of the tissue is a useful tool for discriminating between healthy, diseased and injured biological tissues. Typically, at least a portion of a tissue may become stiffer than surrounding tissues indicating an onset or presence of a disease. By way of example, a relatively stiff region of a tissue may indicate cancer, tumor, fibrosis, steatosis or other such conditions.

Acoustic Radiation Force Impulse (ARFI) imaging is a radiation force based imaging technique that provides information about localized mechanical properties such as tissue stiffness. Particularly, ARFI imaging uses focused ultrasound to apply short duration localized radiation force impulses to a small volume of a tissue. These impulses, or pushing pulses, generate localized displacements of the tissue typically on the order of 1-10 μm. Conventional B-mode imaging pulses are then used to track the tissue displacements generated in response to the pushing pulses. By repeating ARFI sequences along multiple image lines, two-dimensional (2D) or three-dimensional (3D) images of the tissue displacements can be created. ARFI imaging, thus, is useful for observing lesions that are difficult to visualize with conventional sonography, but and are stiffer or softer than surrounding tissues.

Conventional ARFI imaging, however, suffers from time consuming data acquisition, high processing power requirements, loss of focus, low frame rates, and significant tissue and transducer heating. These issues arise in part because of the long round trip propagation time of the pulses along each scan line, the need for a large number of push locations and computations for imaging large areas of the tissue. Certain ARFI imaging techniques propose normalizing the tissue displacement over a depth or smaller apertures to mitigate beam focusing issues. Such techniques, however, typically result in lower beam intensity and poor signal-to-noise ratio outside a region of focus. Another technique uses multiple line acquisition to improve a frame rate while imaging by acquiring multiple scan lines in parallel for each transmitted pulse. Multiple line acquisition, however, results in reduced beam intensity and may also introduce artifacts that degrade image quality.

It is, thus, desirable to develop effective methods and systems for enhanced ARFI imaging performance. Particularly, there is a need for methods and systems, for example, that extend an effective depth range of ARFI imaging, improve the frame rate and spatial resolution while reducing the ultrasound radiation dosage.

BRIEF DESCRIPTION

In accordance with aspects of the present technique, an ultrasound imaging method is presented. The method includes configuring a plurality of apertures in a transducer array of an ultrasound imaging device, where the plurality of apertures includes one or more transducer elements in the transducer array. Further, one or more reference pulses are delivered to a plurality of target regions to detect initial positions of the plurality of target regions. Additionally, a pushing pulse is delivered to at least two of the plurality of target regions through at least two of the plurality of apertures. To that end, the plurality of apertures is focused at specific target regions in the plurality of target regions using a compound delay profile. Subsequently, one or more tracking pulses are delivered to the plurality of target regions for detecting corresponding displacements of at least the specific target regions in the plurality of target regions.

In accordance with a further aspect of the present technique, another ultrasound imaging method is described. The method includes delivering one or more reference pulses to a plurality of target regions to detect corresponding initial positions. The method further describes division of two or more pushing pulses into a plurality of shorter pushing pulse segments. The plurality of shorter pushing pulse segments corresponding to each of the two or more pushing pulses is delivered to corresponding target regions in an interleaving manner. Subsequently, one or more tracking pulses are delivered to the plurality of target regions for detecting a displacement of each of the plurality of target regions.

In accordance with another aspect of the present technique, a non-transitory computer readable storage medium with an executable program thereon for ultrasound imaging is disclosed. Particularly, the executable program instructs a processing unit to deliver one or more reference pulses to a plurality of target regions to detect corresponding initial positions. Next, the program instructs the processing unit to deliver a pushing to a particular location. Further, one or more tracking pulses are delivered to the plurality of target regions in an interleaving manner for detecting a displacement of each of the plurality of target regions in response to the pushing pulse delivered to the particular location under program instruction.

In accordance with aspects of the present system, an ultrasound imaging system is presented. The system includes a transducer array comprising a plurality of transducer elements that generate a pulse sequence comprising at least one tracking pulse and at least one pushing pulse. The system further includes a controller coupled to the transducer array. The controller groups the plurality of transducer elements into one or more apertures for focusing the pulse sequence at one or more target regions. Further, the controller computes a compound delay profile for controlling a delivery time and a delivery position of the pulse sequence through the two or more apertures. Additionally, the controller also configures the two or more apertures to deliver the pulse sequence to the one or more target regions using the compound delay profile. Accordingly, the system further includes a signal processing unit for processing data received from the one or more target regions in response to the pulse sequences.

DRAWINGS

These and other features, aspects, and advantages of the present technique will become better understood when the following detailed description is read with reference to the accompanying drawings in which like characters represent like parts throughout the drawings, wherein.

Figure 6:
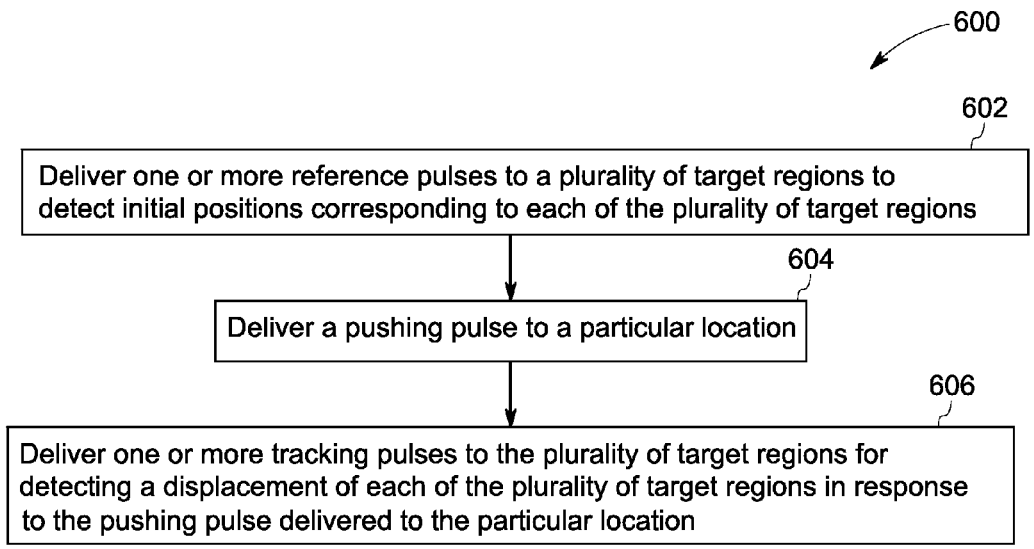
Figure 7:
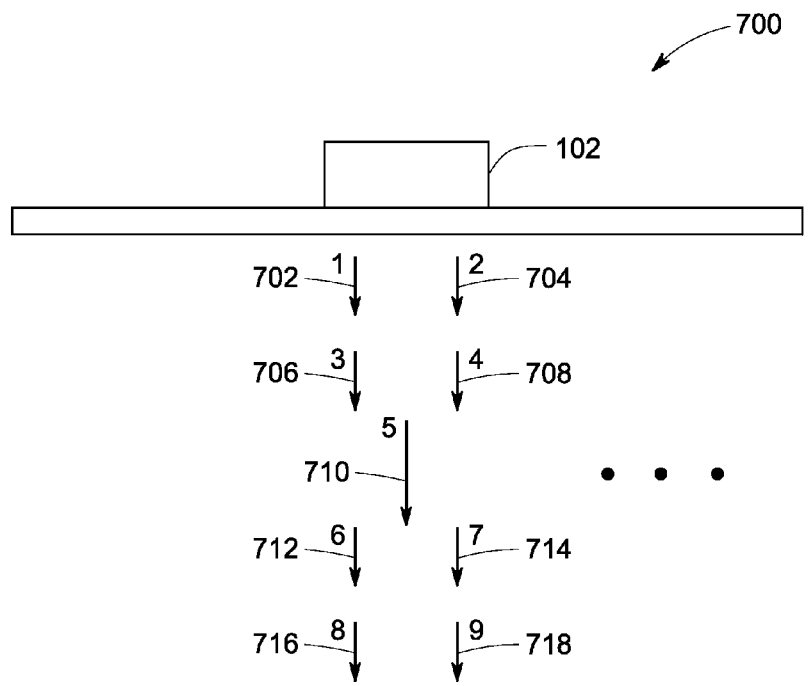

FIG. 6 is a flow diagram depicting an exemplary ARFI imaging method using a sequential scan sequence for detecting displacements of a plurality of target regions caused by a pushing pulse delivered to a single location, in accordance with aspects of the present technique; and FIG. 7 a graphical representation of an exemplary sequence of delivering time interleaved tracking pulses for detecting displacements of a plurality of target locations caused by a pushing pulse delivered to one location using the method of FIG. 6.

DETAILED DESCRIPTION

The following description presents systems and methods for enhanced ARFI imaging. Particularly, certain embodiments illustrated herein describe the systems and the methods that extend an effective depth range of ARFI imaging, improve frame rates and spatial resolution while imaging a target object such as biological tissue. Although the following description includes only a few embodiments, the ARFI imaging systems and methods may be implemented in various other imaging systems and applications to achieve high quality images with optimized dose control. By way of example, the ARFI imaging systems and methods may be used for monitoring targeted drug and gene delivery, nondestructive testing of elastic materials such as plastics and aerospace composites that may be suitable for ultrasound imaging. An exemplary environment that is suitable for practicing various implementations of the present system is described in the following sections with reference to FIG. 1.

Figure 1:
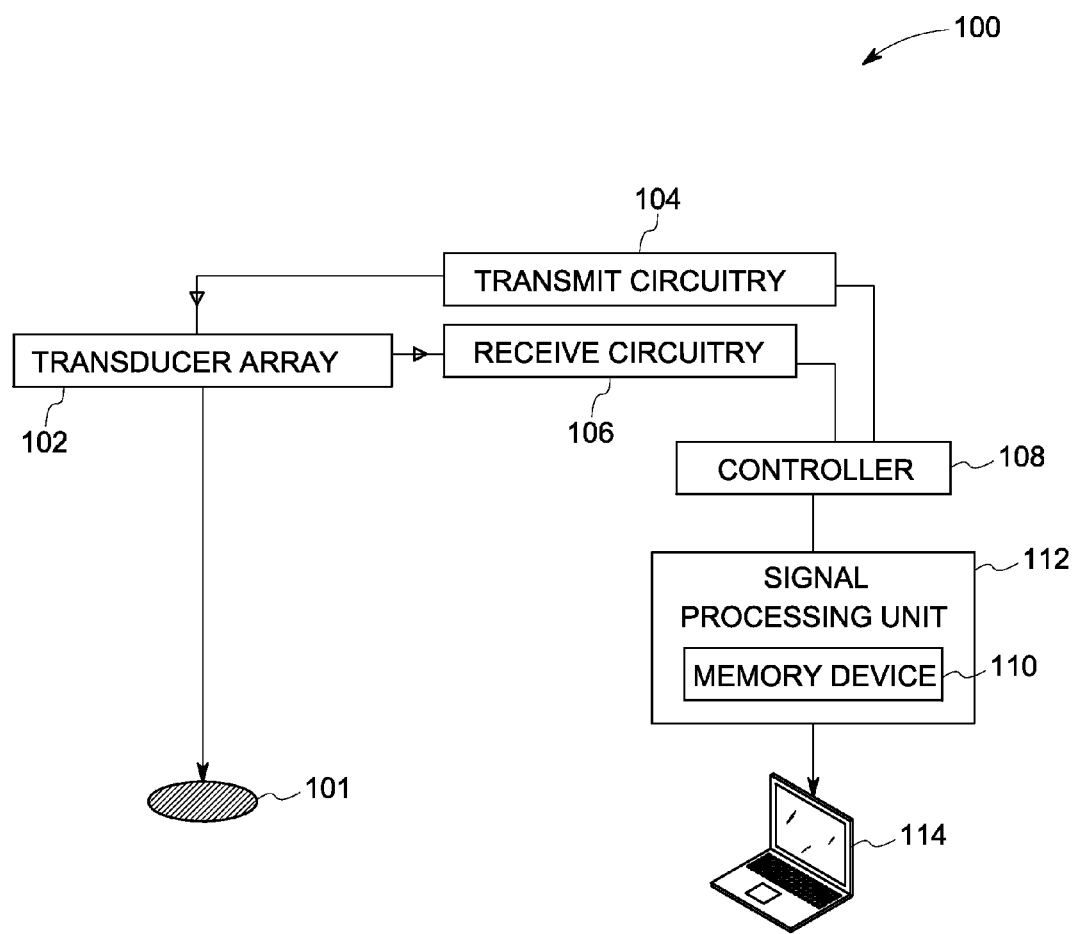
FIG. 1 is a schematic representation of an exemplary ARFI imaging system, in accordance with aspects of the present system.

FIG. 1 illustrates an ultrasound imaging system 100 for imaging a target region 101 using one or more ARFI pulse sequences. By way of example, the target region 101 may include one or more biological tissues such as cardiac tissues, liver tissues, breast tissues, prostate tissues, thyroid tissues, lymph nodes, vascular structures and/or other objects suitable for ultrasound imaging. Accordingly, in one embodiment, the system 100 includes a one-dimensional (1D) or a two-dimensional (2D) transducer array 102 directed towards, for example, a 2D plane, or a 3D volume including the target region 101. To that end, the transducer array 102 includes one or more acoustic transducers, such as piezoelectric transducers, having one or more desired shapes and arranged in a desired pattern. Further, the transducer array 102 is generally housed within a probe and has a transmission window that delivers the one or more pulse sequences to the target region 101 and receives the reflected signals.

Typically, the transducer array 102 is in physical contact with the tissue that contains the target region 101 while delivering the pulse sequences. Alternatively, the transducer array 102 may deliver the pulse sequences to the target region 101 using a suitable medium such as a gel pad, a transmission fluid, or any other suitable coupling material. Further, each pulse sequence may include, for example, one or more tracking pulses, one or more pushing pulses, one or more reference pulses, or combinations thereof. As used herein, the term "tracking pulse" refers to an ultrasonic beam used to detect the position of a tissue. Further, the term "pushing pulse" refers to an ultrasonic beam with higher transmitting energy used to displace the tissue. Further, the pulse sequence may also include a "reference pulse" that is similar to a normal tracking pulse fired at a time when there is little expected motion or a known amount of motion. The reference pulse is typically fired prior to a pushing pulse, or long after a push at a point in time at which the tissue is considered to have returned to a resting or equilibrium position.

The transducer array 102 for the ARFI system 100 delivers the one or more reference pulses, tracking pulses and/or pushing pulses to the target region 101 in a particular delivery sequence using a compound delay profile. As used herein, the term "compound delay profile" refers to a plurality of time delays between acoustic pulse firings on each transducer element of the transducer array 102. Particularly, the relative time delays are chosen such that the pulse from each transducer element adds in phase at a particular focal spot according to specific application requirements. Further, the term "delivery sequence" refers to a particular sequence in which the transmit circuitry 104 delivers the ultrasound pulses to focus at a desired depth and/or spatial location corresponding to the target region 101. Particularly, the delivery sequence specifies the type of pulse (pushing, reference, or tracking) and/or the time and spatial location for each firing using the compound delay.

In accordance with aspects of the present technique, the compound delay profile may be used to deliver ARFI pulse sequences to a target region to achieve a substantially uniform beam intensity over depth, improve frame rates and reduce data acquisition time and dosage for imaging the target region. Exemplary ARFI imaging methods using a custom focal setup and a compound delay profile are described in greater detail with reference to FIGS. 2-7.

In certain embodiments, the system 100 includes transmit circuitry 104 operatively coupled to the transducer array 102 for delivering the ultrasound pulses to the target region using the compound delay profile. Accordingly, the transmit circuitry 104 may include, for example, a transmit beamformer, a processing unit and/or timing circuitry (not shown). The transmit circuitry 104 transmits the one or more tracking and/or pushing pulses to the transducer array 102 according to a scan sequence centered along straight lines in space that are generally referred to as transmit scan lines. In one embodiment, the transmit pulses include one or more tracking pulses and pushing pulses delivered to the target region 101 in the determined scan sequence centered along the transmit scan lines. The transmit scan lines may be appropriately spaced using the determined scan sequence to produce a planar linear, planar sector or other display of the target region based on imaging requirements.

Particularly, the transmit circuitry 104 delivers the transmit pulses sequentially or simultaneously along different scan lines, or different focal depths along the same scan line (compound focus) for imaging at least a section of the target region 101. The focused transmit pulses from the transducer array 102 propagate through the target region and at least a portion of the ultrasound signal reflects back to the transducer array 102. Typically, the portion of the ultrasound signal that reflects back to the transducer array 102 depends on material properties such as the varying tissue density, which relates to stiffness or a thickness, of the target region 101.

Further, the system 100 includes a receive circuitry 106 operatively coupled to the transducer array 102 for receiving the reflected ultrasound signal and related information from the target region 101. Particularly, the receive circuitry 106 focuses receive echoes along straight lines, or certain curved paths in space called receive scan lines. Typically, a round trip delay time is shortest for a location closest to the transducer array 102, and longest for a location farthest from the transducer array 102. Accordingly, in one embodiment, the receive scan lines may extend from the shallowest focal depth of interest to the deepest focal depth of interest of the target region 101. The receive circuitry 106, thus, samples the receive echoes at a plurality of focal depths along each of the receive scan lines to determine information corresponding to the reflected signals received by the transducer array 102.

Further, according to certain aspects of the present system, the transmit circuitry 104 and/or the receive circuitry 106 are electronically coupled to a controller 108 for controlling the flow of data through the system 100. Particularly, the controller 108 computes the compound delay profile for controlling the delivery sequence of the different pulses, frequency of delivering the tracking pulses and the pushing pulses, a time delay between two different pulses, beam intensity and/or other imaging system parameters. Additionally, the controller 108 is configured to store the information received from the target region 101 in a memory device 110 for further processing. To that end, the memory device 110 may include storage devices such as a random access memory, a read only memory, a disc drive, solid state memory device and/or a flash memory.

In certain embodiments, a signal processing unit 112 processes the information stored in the memory device 110 to generate high quality images illustrative of one or more mechanical properties of the target region. Although FIG. 1 depicts the memory device 110 as a part of the signal processing unit 112, alternative embodiments may employ a memory device that is independent or is a part of another system communicatively coupled to the system 100. Particularly, the signal processing unit 112 may further display, print, store, or transmit these images to other parties for review and analysis. In certain embodiments, the signal-processing unit 112 may directly receive the information from the controller 108 to generate ultrasound images along with the images indicative of the mechanical properties corresponding to the target region. To that end, the signal processing unit 112 may include a digital signal processor, a microprocessor, a microcomputer, a microcontroller, an imaging system and/or any other suitable device. Further, the signal processing unit 112 may be integrated within the system 100 or may be operatively coupled to the system 100 over a wired and/or a wireless communications network such as the Internet. In certain embodiments, however, the signal processing unit 112 may not be a separate entity and may be provided as part of the controller 108 for processing the signal data and generating high quality images corresponding to the target region 101.

Furthermore, the system 100 may include a display device 114, such as a monitor, for displaying the images generated by the signal processing unit 112. In one embodiment, the display device 114 may further include a graphical user interface (GUI) for providing a user with configurable options for imaging the target region. By way of example, the configurable options may include a selectable region of interest (ROI), a focal setup, a delay profile, a scan sequence used for delivering the pulses and/or imaging system settings for generating images indicative of the stiffness of the target region. An exemplary method for imaging the target region using a compound delay profile to customize multiple foci configurations within one transmit event is described in greater detail with reference to FIG. 2.

Figure 2:
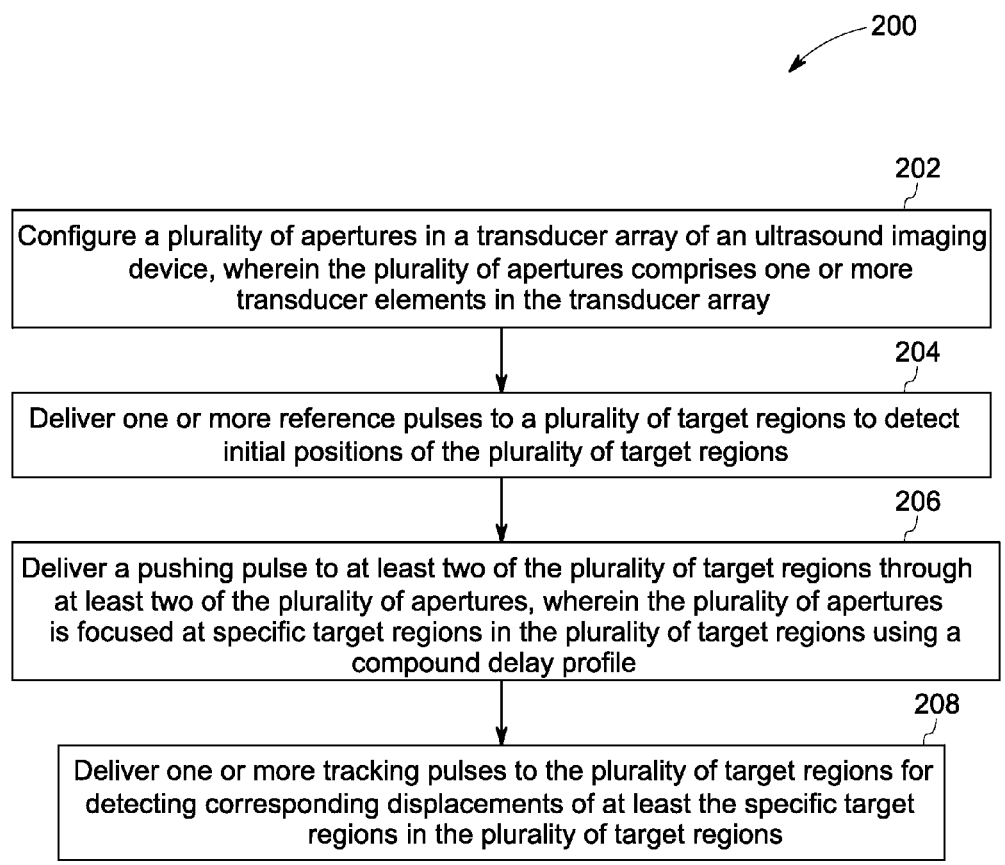
FIG. 2 is a flow diagram depicting an exemplary ARFI imaging method using a custom focal setup, in accordance with aspects of the present technique.

Turning to FIG. 2, a flow chart 200 depicting an exemplary ARFI imaging method, in accordance with certain aspects of the present technique is presented. The exemplary method 200 may be described in a general context of computer executable instructions on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a communication network. In the distributed computing environment, the computer executable instructions may be located in both local and remote computer storage media, including memory storage devices.

Further, in FIG. 2, the exemplary method is illustrated as a collection of blocks in a logical flow chart, which represents operations that may be implemented in hardware, software, or combinations thereof. The various operations are depicted in the blocks to illustrate the functions that are performed generally during different phases of the exemplary ARFI imaging method. In the context of software, the blocks represent computer instructions that, when executed by one or more processing subsystems, perform the recited operations. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein. For discussion purposes, the exemplary method will be described with reference to the elements of FIG. 1.

ARFI imaging is used to differentiate between healthy and diseased tissues based on a force-displacement relationship between the healthy and diseased tissues. Accordingly, ARFI imaging may be used to generate 2D or 3D images for diagnostic and/or prognostic purposes. Typically, during ARFI imaging, the imaging system focus is set at a target region. By way of example, the target region may include regions that may have increased or decreased stiffness relative to the average surrounding tissue such as tumors, cancerous tissues, ablated tissues and/or hardened blood vessels. Although an imaging beam may have a sharper focus at a corresponding focal spot in a conventional ARFI imaging system, the focus gets progressively weakened in regions away from the focal spot, thus affecting imaging performance.

Accordingly, a focal setup of an imaging system such as the system 100 of FIG. 1 is configured to deliver an ARFI pulse sequence to multiple focal positions. Particularly, in one embodiment, the focal setup is configured using the transducer elements in a 1D or 2D transducer array of an ultrasound imaging device to achieve a substantially uniform beam intensity over varying depths. To that end, at step 202, one or more transducer elements in the transducer array are configured to define a plurality of apertures for focusing the ultrasound pulses at a plurality of target regions. In the presently contemplated configuration, the plurality of target regions may correspond to different spatial locations or different depths corresponding to the same or different spatial locations on the target tissue.

Further, at step 204, a transmit circuitry such as the transmit circuitry 104 of FIG. 1 delivers one or more reference pulses to the plurality of target regions to determine corresponding initial positions of each of the plurality of target regions. Subsequently, at step 206, the transmit circuitry delivers a pushing pulse to at least two of the plurality of target regions through at least two of the plurality of apertures. Particularly, in accordance with aspects of the present technique, the plurality of apertures are focused at specific target regions corresponding to particular depths and/or a particular spatial locations using a compound delay profile.

As previously noted, the term "compound delay profile" refers to relative timing delays applied to the transducer elements in each of the plurality of apertures to fire the pushing pulse focused at the specific target regions. In one embodiment, the imaging system computes the compound delay profile using an algorithm for dividing the apertures and using the geometry of the transducer elements and the specific target regions according to imaging requirements. Particularly, the imaging system computes the plurality of relative delays in the compound delay profile so as to deliver the pushing pulse through the plurality of apertures to displace a larger region in the tissue, or several separate regions of tissue.

Alternatively, the relative delays in the compound delay profile may be selected using an exhaustive search or a directed search in a set of possible discrete delays that optimizes for a peak axial pressure and/or the uniformity of the peak axial pressure along a desired depth of field. Particularly, in one embodiment, a first set of delays may be selected such that the acoustic pulses from a particular set of transducer elements corresponding to a first aperture arrive at a first target region at the same time to enable constructive interference. Another set of transducer elements corresponding to a second aperture, however, may use a different set of delays to enable constructive interference at a second target region.

Additionally, in certain embodiments, different kinds of curves such as those corresponding to an Axicon focus function, a parabolic focus function or a polynomial function may be used to compute the compound delay profile. In such embodiments, the delay between transducer elements positioned at the center of the transducer array and the transducer elements positioned at an edge of the transducer array is continually varied as the focal position varies linearly between two values as a function of distance from the center of the aperture. The continuous delay variation enables the imaging system to focus the pushing pulse at different depths or spatial locations, thus distributing the acoustic power across the different depths/spatial locations to achieve a more uniform displacement. By way of example, a selected delay profile may focus the transducer elements positioned at the center of the transducer array at shallow depths, while focusing the transducer elements positioned at the edge of the transducer array at greater depths.

Alternative embodiments may employ an ellipsoid delay profile or frequency dependent focusing for delivering the pushing pulse to multiple target regions. By way of example, in frequency dependent focusing, the transmit circuitry generates a first frequency component and a second frequency component that facilitate focusing the pushing beam at multiple focal positions. By way of example, the first frequency component causes the pushing pulse to focus at a first depth and/or spatial location corresponding to a first target region. Similarly, the second frequency component causes the pushing pulse to focus at a second depth and/or spatial location corresponding to a second target region. Certain other embodiments use a multi-line transmit scheme where the same aperture is fired using two different delay profiles focusing at two positions at substantially the same time.

Further improvements in ARFI imaging may be made by using the compound delay profile along with selective focusing of individual rows in multi-row transducer arrays. By way of example, a complex mechanical lens may be used along with the compound delay profile to selectively focus each row in the multi-row transducer at a specific depth or spatial location, thus, achieving multiple-foci operation in a single transmit event. Additionally, certain embodiments may employ a complex aperture function that combines apodization or shading along with the use of the compound delay profile to achieve greater uniformity in displacement of each of the plurality of target regions for facilitating subsequent ARFI imaging steps.

Moving to step 208, the transmit circuitry delivers one or more tracking pulses to the plurality of target regions for detecting displacements of at least the specific target regions caused by the pushing pulse. The displacement of the target regions may be in inverse proportion to an elasticity of each of the target regions. Accordingly, in one embodiment, the one or more tracking pulses may measure a level of the displacement of each specific target region in the plurality of target regions using a cross-correlation with the reference pulse or some other tracking pulse. Methods other than cross-correlation may be used to calculate the displacement, including but not limited to a sum of absolute differences, zero crossing techniques, a sum of the square error, least squares estimation, or other suitable motion estimation techniques. In one embodiment, the motion estimation technique may employ, for example, radio frequency (RF) signals, demodulated complex analytic or baseband signals, magnitude and a log detected signal, or signals from any other stage of the processing to determine the 1D, 2D or 3D displacement estimates.

To that end, a processing unit such as the signal processing unit 112 of FIG. 1 may create a displacement map of the displacements detected at the different spatial locations and/or depth over a period of time. Particularly, the processing unit may create the displacement map by correlating the ultrasound signals detected at the different depths and/or spatial locations as a function of time. The displacement maps may be further processed to make maps of one or more characteristics of a target tissue such as a stiffness, a strain, a velocity, a displacement at a specified instant of time, a peak displacement, a time to reach peak displacement and/or a time of decay from peak displacement. The determined tissue characteristics may then be used to identify the presence of a disease or abnormality in the target tissue.

Figure 3A:
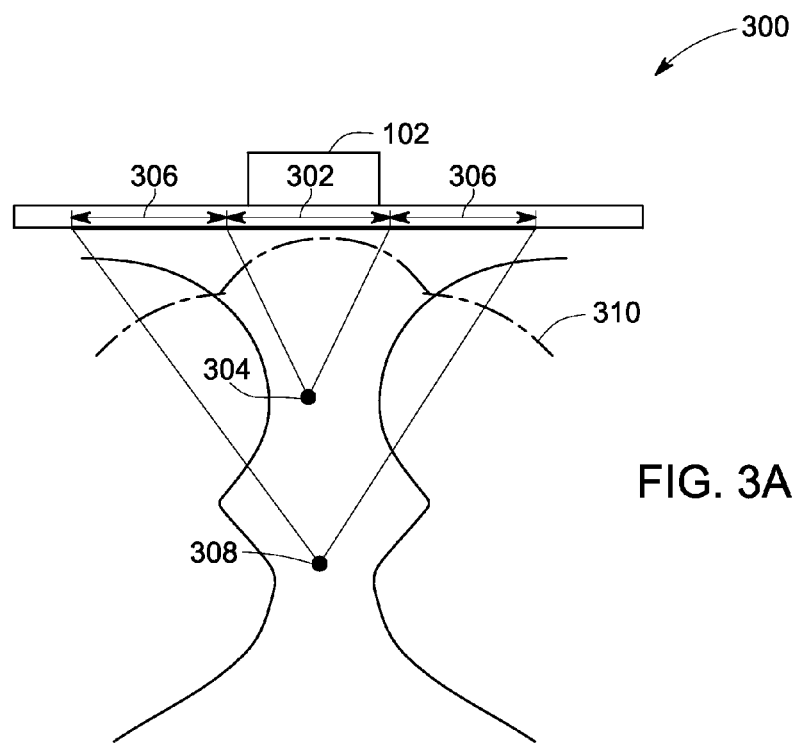
FIG. 3A is a schematic representation of an exemplary configuration of a custom focal setup and a compound delay profile used for ARFI imaging, in accordance with aspects of the present technique.

Further, FIG. 3A illustrates a graphical representation 300 of an exemplary configuration of a focal setup in an imaging system such as the system 100 of FIG. 1. The exemplary configuration depicts multiple focal positions and use of a compound delay profile as described with reference to FIG. 2 to deliver a pushing pulse to the multiple focal positions. In one embodiment, the focal setup includes a first transmit aperture 302 to focus the pushing pulse at a first focal position 304 and a second transmit aperture 306 to focus the pushing pulse at a second focal position 308 using a compound delay profile 310.

The compound delay profile 310 may be determined as described with reference to step 206 of FIG. 2 to optimize a displacement of the first focal position 304 and the second focal position 308 over a desired depth of field. It may be noted that the radiation force is proportional to the ultrasound intensity, which varies over the depth of the transmitted pushing pulse. Accordingly, the radiation force varies over depth of the target region such that the radiation force is the largest at the focal position of the pushing pulse and becomes progressively lesser in regions before and after this focal position. The compound delay profile 310, therefore, may be determined to deliver the pushing pulse to multiple focal positions through a plurality of apertures to displace a larger region in the tissue.

Particularly, the compound delay profile 312 may be computed so as to determine appropriate delays for the transducer elements corresponding to the first transmit aperture 302 and the second transmit aperture 306. The delays, thus determined, are applied to the appropriate set of transducer elements in the first transmit aperture 302 to focus the pushing pulse at the first focal position 304 and in the second transmit aperture 306 to focus the pushing pulse at the second focal position 308. By way of example, a center portion of an overall transmit aperture may be focused at a shallow portion of a target region close to the transducer and the outer edges may be focused at a greater depth of the target region. In one embodiment, the delay profile 312 may be used deliver the pushing pulse to multiple foci in an interleaving manner, simultaneously and/or after a determined time such as a determined propagation delay based on application requirements.

Figure 3B:
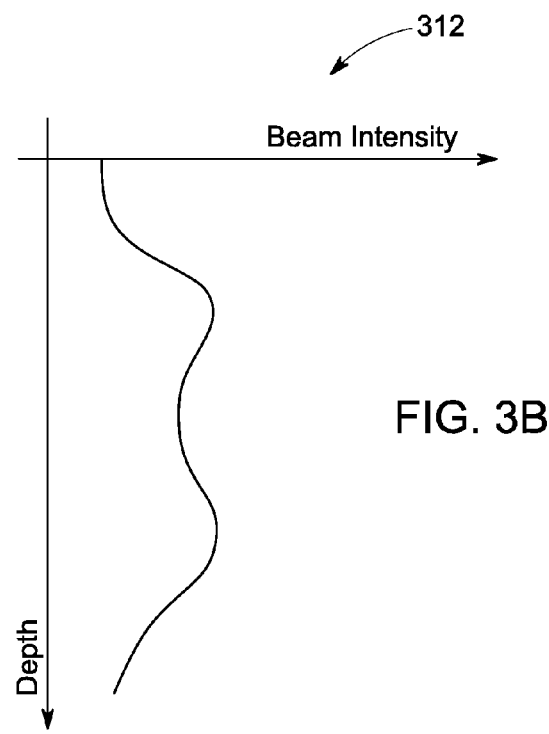
FIG. 3B is a graphical representation of an exemplary distribution of beam intensity over depth achieved by using the custom focal setup of FIG. 3A.

As illustrated by a graphical representation 314 in FIG. 3B, use of the compound delay profile 312 to deliver pushing pulses through the different transmit apertures to multiple foci in the target region facilitates a substantially more uniform distribution of beam intensity over depth when compared to a single tight focus. Additionally, in certain embodiments, use of the multiple transmit apertures maintains large acoustic power, and thus enables generation of high quality displacement images.

Figure 4:
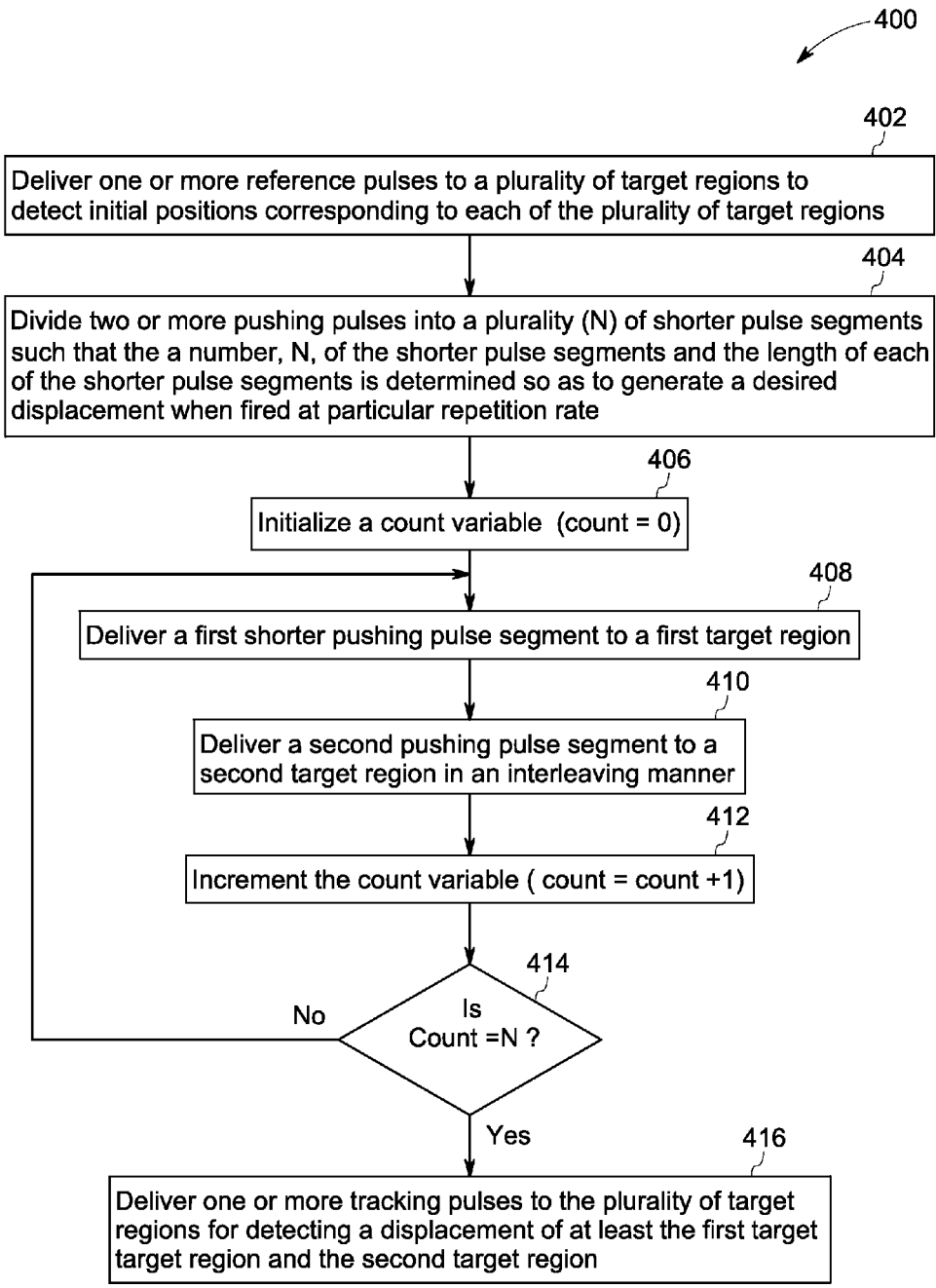
FIG. 4 is a flow diagram depicting an exemplary ARFI imaging method for imaging a target region using interleaved pushing pulse segments, in accordance with aspects of the present technique.

Further, FIG. 4 illustrates a flowchart 400 depicting another exemplary ARFI imaging method for imaging a target region using interleaved pushing pulses. Particularly, the method describes delivering high intensity pushing pulses to multiple focal positions in an interleaving manner. For clarity, the present method will be described with reference to a first and a second pushing pulse delivered to a first and a second target region. It may, however, be noted that the number of pushing pulses and the target regions may be adjusted to be greater than two based on application requirements.

The method begins at step 402 where one or more reference pulses are delivered to a plurality of target regions to detect initial positions corresponding to each of the plurality of target regions. By way of example, the plurality of target regions corresponds to a plurality of depths at a particular location of a target tissue. In certain embodiments, the plurality of target regions may correspond to a plurality of depths and/or a plurality of spatial locations on the target tissue.

The displacement of the target region caused by the pushing pulse is directly proportional to the length of the pushing pulse. Typically, longer pushing pulses cause greater displacement and, thus, are easier to detect. Longer pushing pulses, however, require a longer data acquisition time. Accordingly, in the present ARFI imaging method, the first and the second pushing pulses are delivered to the first and the second target regions as a plurality of shorter pushing pulse segments. To that end, each of the first pushing pulse and the second pushing pulse is divided into a plurality of shorter pushing pulse segments. Particularly, at step 404, the first and second pushing pulses may be divided into a plurality of shorter first pushing pulse segments and shorter second pushing pulse segments, respectively. Unlike conventional ARFI imaging, in the present ARFI imaging method, the plurality of shorter first and the second pushing pulse segments may be delivered to the first and the second target region, respectively, without delivering any tracking pulses in between the plurality of the first and the second shorter pushing pulse segments.

Further, the first and second shorter pushing pulse segments are generated so as to have either the same or different parameters such as frequency, amplitude, pulse length and/or acoustic force according to imaging requirements. By way of example, the acoustic power of the first and the second shorter pushing pulse segments may be adjusted according to a heating limitation associated with a particular target region. Further, the first and the second shorter pushing pulse segments are delivered to the first and the second target regions, respectively, in an interleaving manner so that displacements at the two target regions are about the same. To that end, a number N of the first and second shorter pushing pulse segments and corresponding pulse lengths are determined. Particularly, the number N and the pulse lengths are determined such that firing the shorter pushing pulse segments at a specific repetition rate generates a desired displacement of each of the plurality of target regions.

Conventional ARFI imaging techniques sequentially push and track displacement at multiple focal zones one after the other to improve ARFI depth range. Such sequential pushing and tracking, however, is time consuming and results in reduced frame rates. The present ARFI imaging method, however, describes delivering the shorter first pushing pulse segments focused at the first target region and the shorter second pushing pulse segments focused at the second target region one after the other in an interleaving manner. Accordingly, at step 406, a count variable is initialized with a zero value. Further, at step 408, one of the plurality of shorter first pushing pulse segments is delivered to the first target region. Similarly, at step 410, one of the plurality of shorter second pushing pulse segments is delivered to the second target region. Subsequently, the count variable is incremented by a value "1" at step 412.

Further, at step 414, the value of the count variable is compared with the value "N". If the value of the count variable is less than "N", the method returns the control to step 408 such that further first and second shorter pushing pulse segments are delivered to the first and second target regions, respectively until the value of the count variable equals "N". When the value of the count variable equals "N," at step 416, one or more tracking pulses are delivered to the first and the second target regions to detect the displacements caused by the first and the second shorter pushing pulses. Particularly, the displacements may be detected by comparing the initial positions of the target regions with corresponding displaced positions of the target regions as detected by the tracking pulses. The displacements, thus detected, at the plurality of target regions may further be used to generate an ARFI image for diagnostic purposes.

Figure 5:
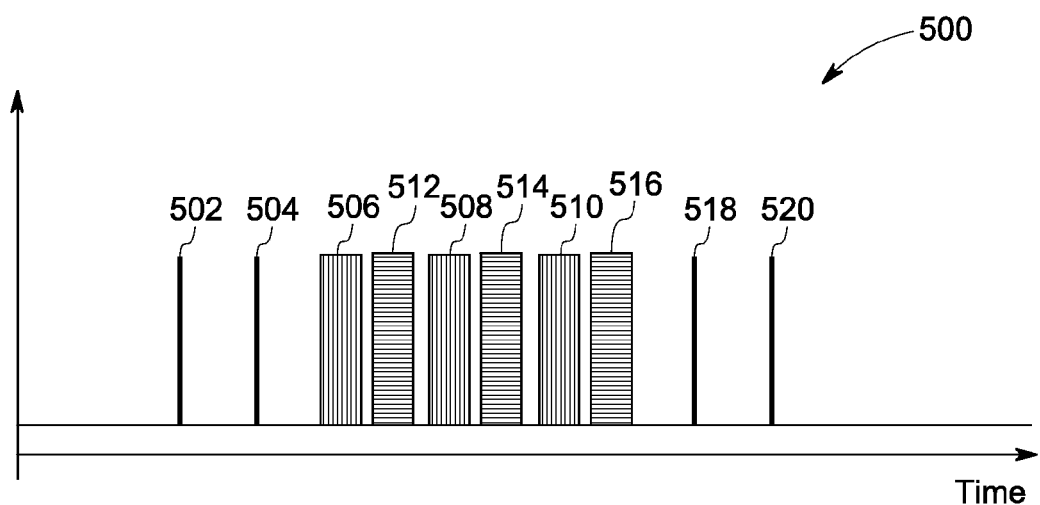
FIG. 5 is a graphical representation of an exemplary sequence of delivering pushing pulse segments at different focal zones in the target region using the method of FIG. 4.

Further, FIG. 5 illustrates a graphical representation 500 of an exemplary sequence of delivering pushing pulses as a plurality of pulses at different focal zones as described with reference to FIG. 4. Particularly, the graphical representation 500 depicts a pulse sequence including a set of reference pulses 502 and 504 delivered to one or more target regions to detect corresponding initial positions of the target regions. In one embodiment, the length of the reference pulses 502 and 504, for example, may be less than 2 microseconds. Further, a time interval between the delivery of the reference pulses 502 and 504 is kept long enough to allow the sound to travel to a deepest depth of a significant signal and back to the transducer. The pulse sequence 500 further includes a plurality of shorter first pushing pulse segments 506, 508 and 510 delivered to the first target region interleaved with delivery of a plurality of shorter second pushing pulse segments 512, 514 and 516 to the second target region.

In one embodiment, for example, each of a first and second 5 MHz pushing pulse, designated to push at the first and the second target locations for about 200 microseconds each, is divided into the three shorter first pushing pulse segments 506, 508 and 510 and the three shorter second pushing pulse segments 512, 514 and 516. A number "N" and other parameters of the shorter pushing pulse segments are determined such that firing the first and second shorter pushing pulse segments at specific repetition rates generate a desired displacement of each of the first and second target regions. Further, in accordance with aspects of the present technique, delivery of the first shorter pushing pulse segments 506, 508 and 510 to the first target region alternates with the delivery of three shorter second pushing pulse segments 512, 514 and 516 to the second target region. Accordingly, in one embodiment, a count variable is initialized to zero and is incremented by 1 every time one of the shorter first and second pushing pulse segments are delivered to the first and second target regions, respectively. By way of example, the shorter first pushing pulse 506 is delivered to the first target region for about 67 microseconds followed by the shorter second pushing pulse 512 to the second target region for about 67 microseconds, further followed by the pulse 508 to the first region and 514 to the second region, and so on.

In certain embodiments, the first and the second target regions may correspond to different depths at the same spatial location of a target tissue. Particularly, in one embodiment, no tracking pulses are delivered in between the delivery of the plurality of shorter first pushing pulse segments 506, 508 and 510 and the plurality of shorter second pushing pulse segments 512, 514 and 516 to the first and the second target regions. However, once the count variable equals N, tracking pulses 518 and 520 may be used to detect displacements at the first and the second target regions, respectively. These displacement values may further be used to generate an ARFI image of the target regions according to application requirements.

Although the embodiment illustrated in FIG. 5 depicts two reference pulses, two tracking pulses and three shorter pushing pulse segments delivered to each of the two target regions, other embodiments may employ a fewer or a greater number of pulses, shorter pulse segments and target regions. Generally, the number and characteristics of these pulses may depend on various factors such as a number of target regions, size of a motion filter function, type of an ARFI image, and other application requirements. Further, in certain embodiments, the reference and/or the tracking pulses may also be delivered to each of a plurality of target regions in an interleaving manner to generate various types of ARFI images and enable use of other image processing functions such as a motion compensation algorithm to impart additional smoothing.

Further, FIG. 6 illustrates another exemplary ARFI imaging method that uses an exemplary sequential scan sequence 600 for detecting displacements at locations other than the focal position during imaging. In one embodiment, an executable program stored on a non-transitory computer readable storage medium may provide suitable instructions to a processing unit for performing the various steps of the present method. Particularly, at step 602, the program instructs the processing unit to deliver one or more reference pulses to a plurality of target regions to detect initial positions corresponding to each of the plurality of target regions using an interleaving scheme. In one embodiment, the plurality of target regions corresponds to, for example, a plurality of laterally separated spatial locations on a target tissue. In alternative embodiments, the plurality of target regions may correspond to a plurality of depths and/or a plurality of spatial locations on the target tissue.

Next, a pushing pulse is delivered to a particular location (push location) at step 604. To that end, the spatial width of the pushing pulse may be adjusted to cover a large area of a target tissue. In one embodiment, the large area includes some or all of the plurality of target regions. Typically, the spatial width (full width at half maximum) of the pushing pulse is equal to the f-number (ratio of focal depth to aperture size) times the pushing pulse wavelength. In one embodiment, the width of the pushing pulse may be altered by adjusting a delay profile and/or one or more characteristics of an aperture used for delivering the pushing pulse. Particularly, the delay profile and/or the aperture characteristics may be altered to increase the f-number of the pushing pulse, thus increasing the width of the pushing pulse. A wider pushing pulse, however, may cause a reduction of acoustic force delivered to each target region, thus resulting in inadequate pushing at the plurality of target regions. Inadequate pushing may affect the detection of a displacement response at the plurality of the target regions. The width of the pushing pulse, thus, is limited by the amount of acoustic force required by the plurality of target regions.

Further, at step 606, one or more tracking pulses are delivered, for example, using an interleaving scheme, to the plurality of target regions for detecting a displacement of each of the plurality of target regions in response to the pushing pulse delivered to the particular location. Accordingly, in the present ARFI imaging method, information from multiple locations may be collected by using a single pushing pulse, thus improving frame rates and facilitating faster image generation. Additionally, use of only a single pushing pulse to collect information from the plurality of target locations reduces the amount of ultrasound power delivered to the target tissue. Reduction of the ultrasound power reduces heating effects in the target tissue while optimizing the radiation dose administered to the patient. An exemplary sequence delivered to the plurality of target regions in accordance with the present ARFI imaging method is illustrated in FIG. 7.

Particularly, FIG. 7 depicts an exemplary sequence of delivering pushing pulses at different tracking locations using the method described with reference to FIG. 6. As illustrated, a plurality of reference pulses 702, 704, 706 and 708 are delivered to a plurality of target regions in an interleaving manner. As previously noted, the reference pulses 702, 704, 706 and 708 are used to determine an initial or reference position of the plurality of target regions. Subsequently a pushing pulse 710 may be delivered to a particular push location. Delivering a pushing pulse having an appropriate width and/or acoustic power to the push location causes displacements at the point of delivery as well as in the plurality of target regions. These displacements may be detected by the plurality of tracking pulses 712, 714, 716 and 718 delivered to the plurality of the target regions in an interleaving manner. Displacement data collected from the plurality of target regions caused by a single pushing, pulse, thus, is used to generate a region of a displacement image. In certain embodiments, the present ARFI method may further employ multiple line receive acquisition along with the time-interleaved tracking pulses 712, 714, 716 and 718 to enable faster image generation with optimized radiation dose.

The exemplary ARFI imaging methods described with reference to FIGS. 2, 4 and 6 may be used individually or in combination to greatly improve the ARFI imaging performance and to trade-off frame rate, resolution, and thermal dose. By way of example, the method of FIG. 4 may be combined with the method of FIG. 2 such that the first and the second shorter pushing pulse segments may be delivered in an interleaving manner using a compound delay profile. Particularly, the compound delay profile may enable focusing the pushing pulses on to the multiple target regions using different portions of the overall transmit aperture to distribute the acoustic power over the different depths. The distribution of acoustic power results in a more uniform displacement without requiring additional transmit events, thus reducing the radiation dose. Further, use of appropriate delay profiles results in near optimal peak axial pressure and near optimal displacement of the target tissue. The optimal displacement values may then be used to determine more accurate information about the target tissue.

Further, the present description includes embodiments that describe the displacement response of the target region with respect to the pulse sequences. Alternative embodiments, however, may also employ other responses of the tissues such as strain, strain-rate and change in amplitude of the tracking pulses to study mechanical properties of a target region. To that end, speckle tracking techniques, a sum of absolute differences, iterative phase zeroing, direct strain estimators, cross-correlation and auto-correlation techniques may be employed for detecting the displacement and/or other parameter values corresponding to a target tissue.

The systems and methods disclosed hereinabove, thus, may be employed to assess mechanical properties of tissue or any other material that is suitable for ARFI imaging. By way of example, the systems and methods facilitate characterization of arterial stiffness, assessment of muscle tone and assessment of kidney stiffness for distinguishing between healthy and diseased tissues. Additionally, the exemplary ARFI imaging methods may also be used in radio frequency (RF) ablation therapy such as used for liver cancer to monitor the progress of the therapy in near real-time.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An ultrasound imaging method, comprising:
configuring an overall transmit aperture comprising a plurality of apertures in a transducer array of an ultrasound imaging device, wherein the plurality of apertures comprises one or more transducer elements in the transducer array;
delivering one or more reference pulses to a plurality of target regions to detect initial positions of the plurality of target regions, wherein the plurality of target regions corresponds to two or more regions of a target object having different depth values, different lateral locations, or a combination thereof;
determining a compound delay profile that distributes acoustic power corresponding to a single pushing pulse in an acoustic radiation force impulse imaging sequence to at least two distinct regions in the plurality of target regions to achieve multiple foci operation in a single transmit event using a compound focus;
  wherein the compound focus comprises at least two of the plurality of apertures corresponding to distinct portions of the overall transmit aperture;
  wherein the at least two distinct regions have different depths, different spatial locations, or a combination thereof; and
  wherein the compound delay profile distributes the acoustic power to the two distinct regions so as to achieve a plurality of desired peaks in axial pressure along the plurality of target regions to displace a larger region in the target object and improve uniformity of beam intensity and displacement of the plurality of target regions as compared to a displacement and a beam intensity achieved using a single focus;
delivering the pushing pulse to the two distinct regions in the plurality of target regions using the compound delay profile; and
delivering one or more tracking pulses to the plurality of target regions for detecting corresponding displacements of at least the two distinct regions in the plurality of target regions.

2. The method of claim 1, further comprising computing the delay profile based on the geometry of the transducer array and a desired depth of field.

3. The method of claim 2, wherein configuring a plurality of apertures in a transducer array comprises:
selecting the two distinct regions in the plurality of target regions, wherein each of the two distinct regions has a particular depth corresponding to a desired depth of field;
grouping the one or more transducer elements in the transducer array into the plurality of apertures; and
computing the compound delay profile for configuring the plurality of apertures to deliver the pushing pulse to each of the two distinct regions having the particular depth.

4. The method of claim 2, wherein computing the delay profile comprises continually varying a delay between the one or more transducer elements positioned at the center of the transducer array and the one or more transducer elements positioned at an edge of the transducer array for focusing the one or more transducer elements positioned at the center of the transducer array at a first depth in the desired depth of field, and focusing the one or more transducer elements positioned at the edge of the transducer array at a second depth in the desired depth of field, wherein the second depth is greater than the first depth.

5. The method of claim 2, wherein computing the delay profile comprises continually varying a delay between the one or more transducer elements as a function of distance of the one or more transducer elements from the center of a corresponding aperture.

6. The method of claim 2, wherein computing the delay profile comprises selecting the delay profile using an exhaustive search, a directed search, or a combination thereof, of possible discrete delays to achieve the desired peak axial pressure and improve the uniformity of the achieved peak axial pressure along the desired depth of field.

7. The method of claim 1, further comprising delivering the one or more reference pulses, the one or more tracking pulses, or a combination thereof, in an interleaving manner.

8. The method of claim 1, wherein detecting the displacements comprises using speckle tracking, a sum of absolute differences, an iterative phase zeroing technique, a direct strain estimation, a cross-correlation, an auto-correlation, or combinations thereof, for detecting the displacement of at least the two distinct regions over a determined period of time.

9. The method of claim 1, further comprising determining one or more characteristics of the plurality of target regions using data corresponding to the one or more tracking pulses, wherein the one or more characteristics of the plurality of target regions comprises a stiffness, a strain, a velocity, a displacement at a specified instant of time, a peak displacement, a time to reach peak displacement, a time of decay from peak displacement, or combinations thereof.

10. The method of claim 1, wherein the plurality of target regions comprises a biological tissue or a compressible portion of an object for industrial inspection.

* * * * *